Aug. 8, 1950     C. R. PUGH     2,517,925
ARTIFICIAL BAIT
Filed June 29, 1944
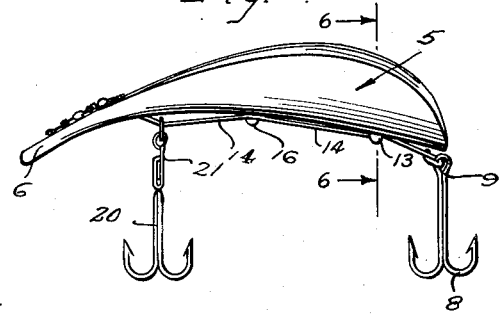
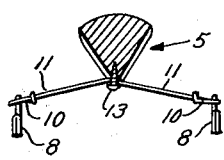
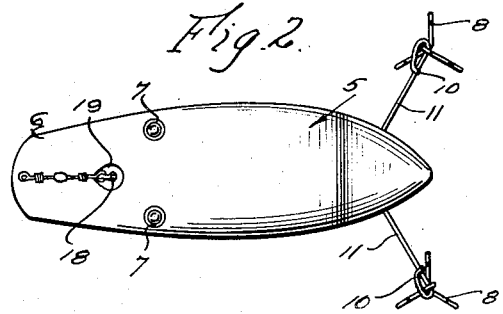
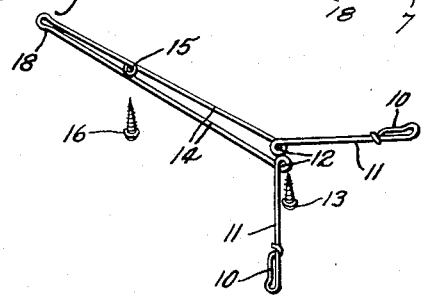
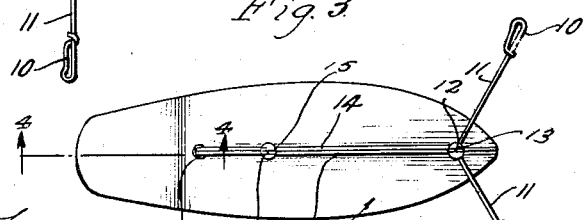
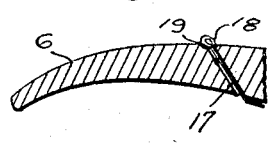
Inventor
Charles R. Pugh
By Clarence A. O'Brien
and Harvey B. Jacobson
Attorneys Patented Aug. 8, 1950

2,517,925

UNITED STATES PATENT OFFICE 2,517,925

ARTIFICIAL BAIT

Charles R. Pugh, Terre Haute, Ind.

Application June 29, 1944, Serial No. 542,669

2 Claims. (Cl. 43—42.36)

This invention relates to new and useful improvements in artificial bait such as is used by fishermen in attracting and catching fish.

The principal object of the present invention is to provide an artificial bait which will be highly attractive to fish and artfully constructed with a view toward hooking fish attracted to the same.

Another important object of the invention is to provide an artificial bait which is not only attractively constructed but which carries a battery of three multiple hooks and which is provided with simple yet positive means for retaining these hooks connected to the body of the artificial bait.

Still another important object of the invention is to provide an artificial bait wherein an element is employed along the body of the bait with the hook or hooks attached to one end and the line to the other end, to the end that in the event the body should become broken, in no event could the fish break away with the hook, because of this tie in of the elements with the fishing line.

Other objects and advantages of the invention will become apparent to the reader of the following description.

In the drawings—

Figure 1 is a side elevation.

Figure 2 is a top plan view.

Figure 3 is a bottom plan view but without the hooks.

Figure 4 is a longitudinal sectional view taken substantially on the line 4—4 of Figure 3.

Figure 5 is a detail of the wire and link connection between the fish line and the hooks.

Figure 6 is a transverse sectional view taken substantially on the line 6—6 of Figure 1.

Referring to the drawings wherein like numerals designate like parts, it can be seen that the numeral 5 denotes generally the body of the bait which may be of any desired material. The rear portion of the body is of substantially triangular cross-section, the side portions gradually tapering forwardly to merge with a flat and rather thin forward portion 6 which is somewhat curved on a line with a mild curve of the top portion of the body 5.

The top portion of the body 5 may have a pair of eye simulating marks 7 thereon.

The body of the artificial bait carries a pair of multiple hooks 8, 8 at the rear thereof, these hooks having each an eye 9 which fits into the looped snap fastener ends 10 of a doubled spring wire member 14, the single wire end portions of which diverge rearwardly to form arms 11 as shown in Figure 2. The intermediate portions of the spring wire member 14 are formed to provide eyes 12 through which a screw 13 is disposed and driven into the bottom portion of the body 5. This double wire member 14 is twisted so as to form another intermediate eye or loop 15 through which a second screw 16 is disposed and driven into the body 5 to hold the wire member 14 fast thereto.

The forward portion of the body 5 has an inclined bore 17 through which the forward end of the wire member 14 is disposed, the upper end of this wire member 14 being formed to provide a fish line attaching loop or eye 18 which seats in a small countersink 19.

A forward multiple hook 20 has an eye which engages with a carrier 21 and this carrier slides freely on the portion of the wire member 14 between the screw 16 and the bore 17.

It will be observed that the elongated wire member 14 is at its forward end attached to a swivel which in turn is adapted to be attached to a fishing line, while the rear end is positively connected with the diverging spring arms 11 which in turn carry the hooks 8. Therefore, in the event the body portion of the bait should come apart, there would be a positive connection of the fish line with the hooks 20 and 8 to the end that a hooked fish could still be brought in.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An artificial bait including a body member, a doubled spring wire member having looped portions intermediate the ends thereof and secured to said body member, screws inserted through the looped portions into said body member, the ends of said wire member diverging and having snap fastening means integrally formed thereon, and the doubled end of the wire member comprising line attachment means.

2. An artificial bait including a body member, a doubled spring wire member having looped portions intermediate the ends thereof and secured to said body member, screws inserted through the looped portions into said body member, the ends of said wire member diverging and having snap fastening means integrally formed thereon, the doubled end of the wire member comprising line attachment means, said body member having a substantially transverse bore at one end, and said doubled end of the wire member extending through said bore.

CHARLES R. PUGH.

REFERENCES CITED

The following references are of record in the file of this patent:

UNITED STATES PATENTS

| Number | Name | Date |
|---|---|---|
| 696,433 | Heddon | Apr. 1, 1902 |
| 881,805 | Klein | Mar. 10, 1908 |
| 963,202 | Bohannan | July 5, 1910 |
| 1,490,161 | Dickman | Apr. 15, 1924 |
| 2,033,829 | Helin | Mar. 10, 1936 |
| 2,189,958 | Middlemiss | Feb. 13, 1940 |
| 2,244,980 | Abramson | June 10, 1941 |
| 2,236,353 | Minser | Mar. 25, 1941 |
| 2,290,702 | Nelson | July 21, 1942 |
| 2,319,026 | Adam | May 11, 1943 |

FOREIGN PATENTS

| Number | Country | Date |
|---|---|---|
| 21,141 | Great Britain | of 1895 |
| 561,810 | France | Aug. 18, 1923 |
| 741,382 | France | Dec. 3, 1932 |